(12) United States Patent
Lee

(10) Patent No.: US 10,868,449 B2
(45) Date of Patent: Dec. 15, 2020

(54) ROTOR AND MOTOR COMPRISING SAME

(71) Applicant: LG INNOTEK CO., LTD., Seoul (KR)

(72) Inventor: Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 3 days.

(21) Appl. No.: 16/468,241

(22) PCT Filed: Dec. 21, 2017

(86) PCT No.: PCT/KR2017/015239
§ 371 (c)(1),
(2) Date: Jun. 10, 2019

(87) PCT Pub. No.: WO2018/124634
PCT Pub. Date: Jul. 5, 2018

(65) Prior Publication Data
US 2020/0014257 A1 Jan. 9, 2020

(30) Foreign Application Priority Data
Dec. 27, 2016 (KR) .................. 10-2016-0180032

(51) Int. Cl.
*H02K 1/24* (2006.01)
*H02K 3/28* (2006.01)
(Continued)

(52) U.S. Cl.
CPC .............. *H02K 1/24* (2013.01); *H02K 3/28* (2013.01); *H02K 3/34* (2013.01); *H02K 3/52* (2013.01); *H02K 16/02* (2013.01)

(58) Field of Classification Search
CPC .. H02K 1/24; H02K 3/28; H02K 3/34; H02K 3/52; H02K 16/02
See application file for complete search history.

(56) References Cited

U.S. PATENT DOCUMENTS

| 6,787,966 | B2 * | 9/2004 | Haga ..................... H02K 1/24 29/732 |
| 2005/0206264 | A1 * | 9/2005 | Yamamoto ............. H01R 39/32 310/216.001 |

(Continued)

FOREIGN PATENT DOCUMENTS

| CN | 1767319 A | 5/2006 |
| CN | 102780287 A | 11/2012 |

(Continued)

*Primary Examiner* — Emily P Pham
(74) *Attorney, Agent, or Firm* — Birch, Stewart, Kolasch & Birch, LLP

(57) ABSTRACT

A rotor comprises: a first motor which comprises a first rotor body and a plurality of first teeth formed on an outer circumferential surface of the first rotor body; a second rotor which comprises a second rotor body stacked on and coupled to the first rotor body and a plurality of second teeth formed on an outer circumferential surface of the second rotor body; a first coil which is wound around the first teeth; a second coil which is wound around the second teeth; a first insulator which is disposed between the first teeth and the first coil; and a second insulator which is disposed between the second teeth and the second coil.

20 Claims, 7 Drawing Sheets

(51) Int. Cl.
*H02K 3/34* (2006.01)
*H02K 3/52* (2006.01)
*H02K 16/02* (2006.01)

(56) References Cited

U.S. PATENT DOCUMENTS

| | | |
|---|---|---|
| 2006/0152188 A1 | 7/2006 | Yasuhara et al. |
| 2012/0286619 A1 | 11/2012 | Tsuiki et al. |
| 2014/0015349 A1* | 1/2014 | Chamberlin ........... H02K 3/345 |
| | | 310/43 |
| 2015/0130386 A1 | 5/2015 | Zumstein et al. |
| 2016/0322871 A1 | 11/2016 | Lee |
| 2017/0310183 A1 | 10/2017 | Jang et al. |

FOREIGN PATENT DOCUMENTS

| | | |
|---|---|---|
| CN | 106100267 A | 11/2016 |
| EP | 1 499 000 A1 | 1/2005 |
| JP | 2006-158174 A | 6/2006 |
| JP | 2012-239347 A | 12/2012 |
| JP | 2013-240259 A | 11/2013 |
| KR | 10-2013-0122335 A | 11/2013 |
| KR | 10-2016-0067338 A | 6/2016 |
| KR | 10-2016-0129376 A | 11/2016 |

* cited by examiner

ROTOR AND MOTOR COMPRISING SAME

CROSS REFERENCE TO RELATED APPLICATIONS

This application is the National Phase of PCT International Application No. PCT/KR2017/015239, filed on Dec. 21, 2017, which claims priority under 35 U.S.C. 119(a) to Patent Application No. 10-2016-0180032, filed in the Republic of Korea on Dec. 27, 2016, all of which are hereby expressly incorporated by reference into the present application.

TECHNICAL FIELD

The teachings in accordance with exemplary and non-limiting embodiments of this invention relate generally to rotor and motor comprising same.

BACKGROUND ART

In general, a vehicle is formed with a starter motor driving an engine and an alternator generating electricity using a rotational force of the engine. The starter motor is configured in such a manner that an ignition switch is connected to a power source of a battery by operation of a driver when the vehicle is started, through which the vehicle is started by rotating an engine using a driving force generated by being supplied with the power to the starter motor.

In comparison thereto, the alternator is configured in such a fashion that a rotor is rotated to generate an AC (Alternating Current) power which then charges a battery using a rectifying device while the alternator is connected to a driving part of an engine to form a magnetic field through a driving force of the engine.

The said starter motor and the alternator are all formed with a structure of a stator and a rotor, which makes the structure very similar therebetween, where the starter motor and the alternator may be operated as a generator or a motor depending on whether a force is applied or whether a power is applied.

Recently, researches are being briskly waged on a BSG (Belt Driven Starter Generator) structure configured to perform a function as a starter motor and as an alternator using one structure.

Meantime, a rotor wound synchronous type motor is a motor where a coil is wound on a protruder protrusively formed on an outer circumferential surface of a rotor, and is largely used for a generator, and is recently also proposed as a type of traction motor concomitant with increased interest in development of non-rare earth motor.

In order to increase torque of a motor, the number of wound coils must be increased or a current must be increased. However, in case of the BSG, there is a high spatial restriction in increasing the number of wound coils, and there is a limit in increasing a torque of a motor due to a limitation in current value for increasing the current.

DETAILED DESCRIPTION OF THE INVENTION

Technical Subject

The present invention is provided to improve the aforementioned problems and therefore, the present invention is to provide a rotor easy in assembly by increasing a space factor of a coil, and a motor comprising the rotor.

Technical Solution

In one general aspect of the present invention, there is provided a rotor comprising:

a first motor which comprises a first rotor body and a plurality of first teeth formed on an outer circumferential surface of the first rotor body;

a second rotor which comprises a second rotor body stacked on and coupled to the first rotor body and a plurality of second teeth formed on an outer circumferential surface of the second rotor body;

a first coil which is wound around the first teeth;

a second coil which is wound around the second teeth;

a first insulator which is disposed between the first teeth and the first coil; and a second insulator which is disposed between the second teeth and the second coil, wherein.

an upper surface of the first insulator disposed at an upper side of the first rotor body may be formed with a first guide part arranged with the first coil, and a lower surface of the second insulator disposed at a lower side of the second rotor body may be formed with a second guide part arranged with the second coil Preferably, but not necessarily, the first guide part and the second guide part may be grooves respectively recessed from an upper surface of first insulator and a lower surface of second insulator.

Preferably, but not necessarily, the first guide part and the second guide part may be lugs respectively protruded from an upper surface of first insulator and a lower surface of second insulator.

Preferably, but not necessarily, the second teeth may be inserted into a first reception groove formed between adjacent the first teeth when the first rotor and the second rotor are coupled, and the first teeth may be inserted into a second reception groove formed between the adjacent second teeth.

Preferably, but not necessarily, a sum of heights of the first rotor body and the second rotor body may correspond to a height of the first teeth or to a height of the second teeth.

In another general aspect of the present invention, there is provided a rotor, the rotor comprising:

a first rotor body;

a first rotor formed with a plurality of first teeth radially protruded from an outer circumferential surface of the first rotor body;

a second rotor formed with a plurality of second teeth stacked on and coupled to a lower side of the first rotor, and radially protruded from the second rotor body and an outer circumferential surface of the second rotor body;

a first coil serially wound to the first teeth; and a second coil serially wound to the second teeth, wherein the plurality of first teeth may be formed in the same winding number as that of the first coil, and the plurality of second teeth may be formed in the same winding number as that of the second coil.

Preferably, but not necessarily, the first coil may be wound to a clockwise direction or to a counterclockwise direction about a center of the first rotor body.

Preferably, but not necessarily, the second coil may be wound to a clockwise direction or to a counterclockwise direction about a center of the second rotor body.

Preferably, but not necessarily, the first teeth may include first, second, third and fourth bodies, protruding from an outer circumferential surface of the first rotor body while maintaining a mutual gap, and the second teeth may include fifth, sixth, seventh and eighth bodies, protruding from an outer circumferential surface of the second rotor body while maintaining a mutual gap.

Preferably, but not necessarily, the first coil may be respectively wound on the first, second, third and fourth bodies to a clockwise direction.

Preferably, but not necessarily, the second coil may be respectively wound on the fifth, sixth, seventh and eighth bodies to a clockwise direction.

Preferably, but not necessarily, when the winding number of second coil wound on the second lug is defined as N, the second coil may be initially wound on the fifth body by N/2 times, wound on the sixth body by N times, wound on the seventh body by N times, wound on the eighth body by N times, and may return to the fifth body to be wound by N/2 times.

Preferably, but not necessarily, when the winding number of second coil wound on the second lug is defined as N, the second coil may be initially wound on the fifth body by N/0.5 times, wound on the sixth body by N times, wound on the seventh body by N times, wound on the eighth body by N times, and may return to the fifth body to be wound by 0.5 times.

In still another general aspect of the present invention, there is provided a motor, comprising:

a housing;

a stator disposed at an inside of the housing; and a rotor disposed at an inside of the stator to face the stator.

Advantageous Effects of the Invention

The rotor and motor comprising same according to the present invention may be configured in such a manner that a plurality of rotor bodies is stacked to form a rotor, each of the rotor body may include teeth wound by a coil, and each of the teeth on the rotor body may be mutually alternately arranged about a circumferential direction to allow the divided teeth to form an entire teeth, whereby a coil space factor can be increased to obtain an advantageous effect of easy winding operation, because the coil can be wound on the divided teeth obtained by a relatively broad winding space, unlike a rotor integrally formed with coil-wound teeth.

Furthermore, a guide part is respectively formed on an upper surface and a lower surface of first insulator and second insulator to allow the coil to be securely supported to the rotor, and to advantageously reduce a consumed amount of coils.

Still furthermore, each rotor may be wound in series with a single coil to advantageously simplify a winding structure of coil.

BEST MODE

Example embodiments will now be described more fully with reference to the accompanying drawings, in which example embodiments are shown. Example embodiments may, however, be embodied in many different forms and should not be construed as being limited to the embodiments set forth herein; rather, many variations, equivalents and modifications may be made to the above-described embodiment(s) without substantially departing from the spirit and principles of the techniques described herein. In describing the present invention, if it is determined that the detailed description on the related known technology makes the gist of the present invention unnecessarily ambiguous, the detailed description will be omitted.

The terminology used herein is for the purpose of describing particular embodiments only and is not intended to be limiting of example embodiments. As used herein, the singular forms are intended to include the plural forms as well, unless the context clearly indicates otherwise. It will be further understood that the terms "comprises" and/or "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first" and "second" are used herein to describe various regions, layers and/or portions, these regions, layers and/or portions should not be limited by these terms. These terms are only used to distinguish one region, layer or portion from another region, layer or portion.

Figure 1:
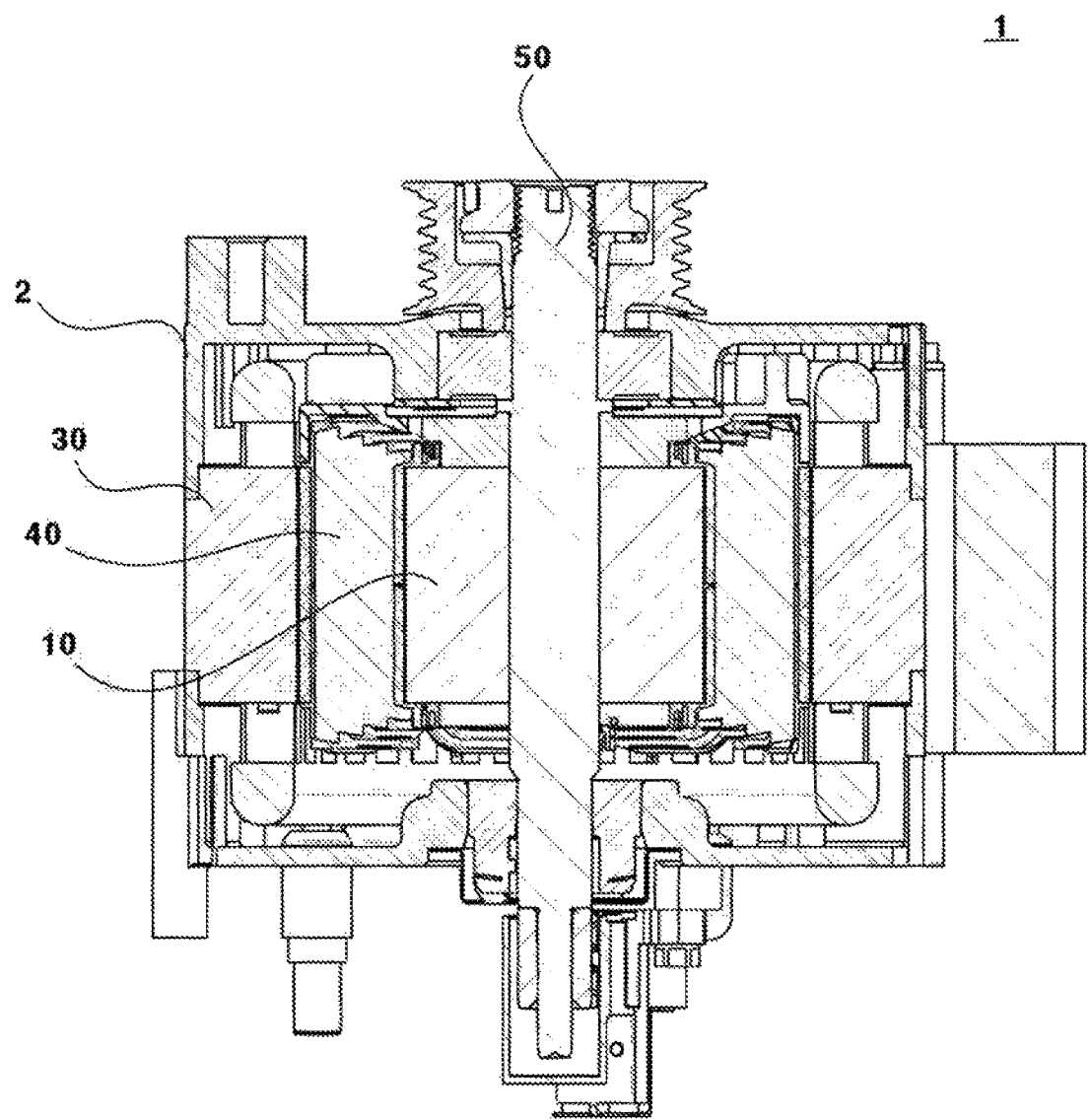
FIG. 1 is a cross-sectional view of a motor according to an exemplary embodiment of present invention.

FIG. 1 is a cross-sectional view of a motor according to an exemplary embodiment of present invention.

Referring to FIG. 1, a motor (1) according to an exemplary embodiment of present invention may be formed in external shape by a housing (2). Furthermore, the housing (2) may include therein a stator (30) and a rotor (10) disposed at an inner side of the stator (30). The rotor (10) may be wound with a coil (40).

The coil (40) may induce rotation of the rotor (10) or induce the generation by the rotor (10) by causing an electromagnetic interaction with the stator (30).

To be more specific, when the motor (1) operates as a starter motor, the rotor (10) may be rotated by an applied driving current to rotate a pulley belt (not shown) connected to a rotation shaft (50) of the rotor (10) and to drive an outside elements (engine and the like).

Unlike thereto, when the motor (1) is operated as an alternator, a pulley belt (not shown) is rotated by an engine driving to rotate a rotor (10) and to generate an AC (Alternative Current). The generated AC may be converted to a DC (Direct Current) to be supplied to outside elements (battery and the like).

Figure 2:
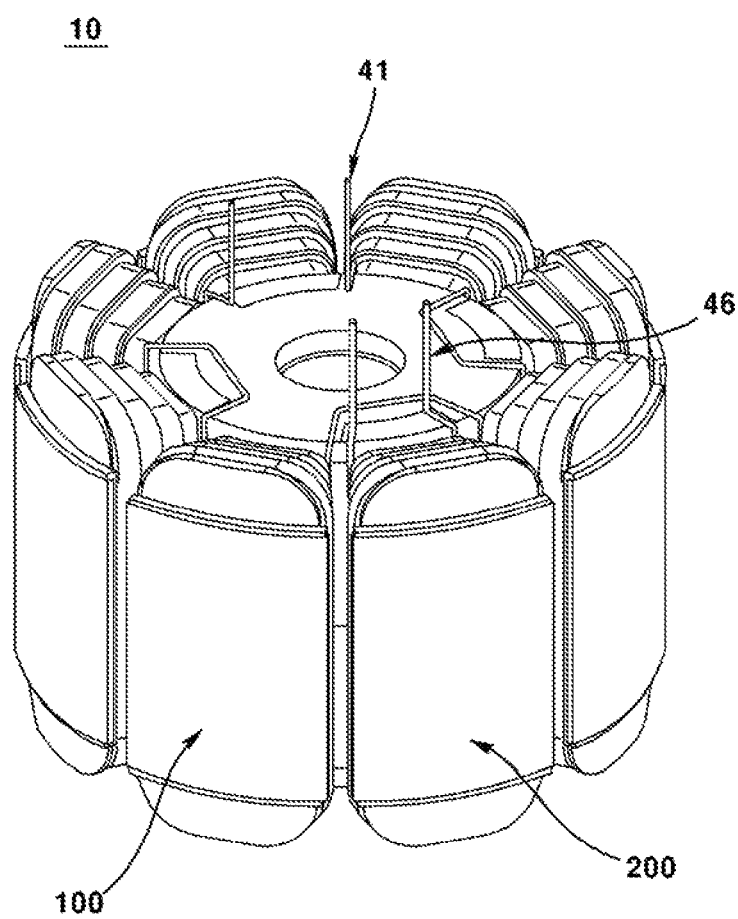
FIG. 2 is a perspective view of a rotor according to an exemplary embodiment of present invention.
Figure 3:
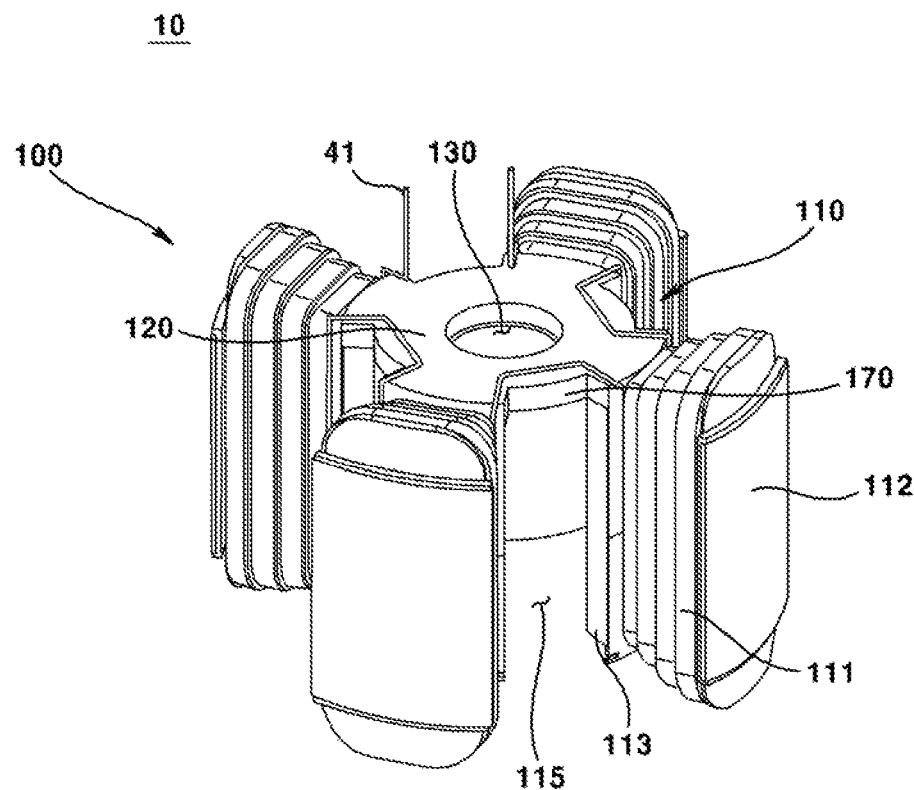
FIG. 3 is an exploded perspective view of first rotor and second rotor according to an exemplary embodiment of present invention.
Figure 3:
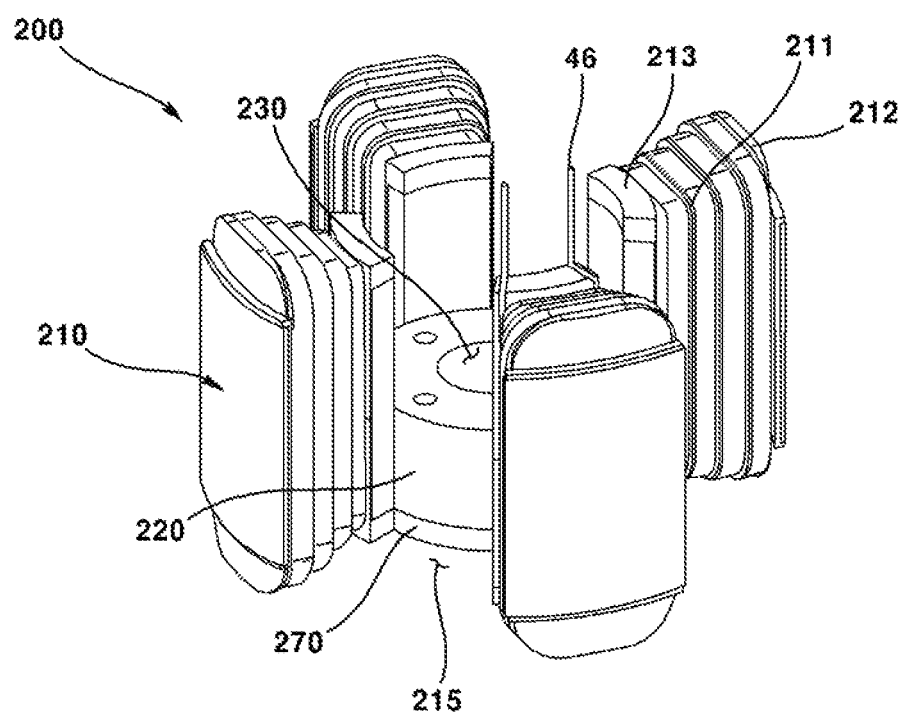

FIG. 2 is a perspective view of a rotor according to an exemplary embodiment of present invention, and FIG. 3 is an exploded perspective view of first rotor and second rotor according to an exemplary embodiment of present invention.

FIGS. 2 and 3 have illustrated essential particular elements in order to clearly understand the conception of the present invention, and the scopes of the present invention are not restricted by the illustrated particular shapes.

Referring to FIGS. 2 and 3, the rotor (10) according to an exemplary embodiment of the present invention may include a first rotor (100) and a second rotor (200). The first and second rotors (100, 200) may form the rotor (10) by being mutually stacked and mutually coupled to a height direction. Furthermore, the first and second rotors (100, 200) may be formed by being stacked of a plurality of plates. Hereinafter, as illustrated, explanation will be given as an example where the first rotor (100) is coupled to an upper side of the second rotor (200).

Referring to FIG. 3, the first rotor (100) may include a cylindrical first rotor body (120) and a plurality of first teeth (110) radially protruded from an outer circumferential surface of the first rotor body (120). Furthermore, the first rotor body (120) may be centrally formed with a hole (130) inserted by a rotation shaft (50).

The first teeth (110) may be formed in a plural number, formed at a predetermined gap along a circumferential direction of the first rotor body (120) and arranged on the outer circumferential surface of the first rotor body (120). Moreover, the first teeth (110) may be wound with a first coil (41) and an insulator (170) may be interposed between the first teeth (110) and the first coil (41) for insulation. The insulator (170) may be coupled with the first rotor (100), such that the insulator (170) may be called a first insulator (170).

To be more specific, the first teeth (110) may include an arm-shaped body (111) connected to the first rotor body (120) and a rim-type shielding lug (112) formed at a tip of the body (111). At this time an area adjacent to the first rotor body (120) on an outside of the body (111) may be protrusively formed with a guide lug (113). An external surface of the body (111) may be formed with an inclination to allow forming a broader cross-sectional area toward an outside.

Furthermore, the first coil (41) may be wound on an external surface of the body (111). At this time, the shielding lug (112) and the guide lug (113) may help ease the winding operation of the first coil (41).

The present exemplary embodiment has exemplified a case where the first teeth (110) is formed in four pieces, each spaced apart at a predetermined distance. The number of the first teeth (110) may be different according to the number of poles in the motor.

The second rotor may include a cylindrical second rotor body (220) and a plurality of second teeth (210) each radially protruded from an outer circumferential surface of the second rotor body (220). The second rotor body (220) may be centrally formed with a hole (230) inserted by a rotation shaft (50).

The first teeth (210) may be formed in a plural number, formed at a predetermined gap along a circumferential direction of the second rotor body (220) and arranged on the outer circumferential surface of the second rotor body (220). Moreover, the second teeth (210) may be wound with a second coil (461) and an insulator (270) may be interposed between the second teeth (210) and the second coil (46) for insulation. The insulator (270) may be coupled with the second rotor (200), such that the insulator (270) may be called a second insulator (270).

To be more specific, the second teeth (210) may include an arm-shaped body (211) connected to the second rotor body (220) and a rim-type shielding lug (212) formed at a tip of the body (211). At this time an area adjacent to the second rotor body (220) on an outside of the body (211) may be protrusively formed with a guide lug (213). An external surface of the body (211) may be formed with an inclination to allow forming a broader cross-sectional area toward an outside.

Furthermore, the second coil (46) may be wound on an external surface of the body (211). The second teeth (210) may be formed in the same number of four (4) as that of the first teeth (110). That is, the second teeth (210) may be disposed at a space formed among the first teeth (110) when the first rotor (100) and the second rotor (200) are coupled, and therefore, the number of second teeth (210) may correspond to that of the first teeth (110).

In other words, as illustrated in FIG. 3, it should be interpreted that the second teeth (210) may be inserted into a first reception groove (115) formed among the adjacent first teeth (110) when the first rotor (100) and the second rotor (200) are coupled, and the first teeth (110) may be inserted into a second reception hole (215) formed among the adjacent second teeth (210). That is, the first and second teeth (110, 210) may be mutually differently disposed about the circumferential direction.

The first rotor (100) may be disposed at an upper side and the second rotor (200) may be disposed at a lower side based on an axial direction to allow respective teeth (110, 210) to be stacked and coupled in a complimentarily state.

Furthermore, each height of the first rotor body (120) and the second rotor body (220) may correspond to a height of the first teeth (110) or to a height of the second teeth (210).

Figure 4:
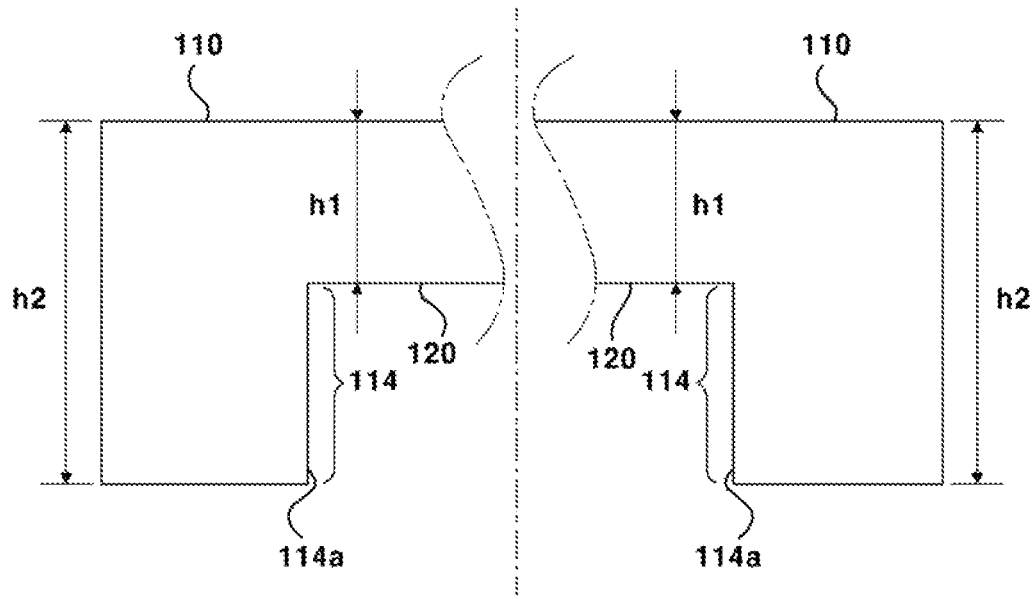
FIG. 4 is a cross-sectional view illustrating a portion of a first rotor according to an exemplary embodiment of present invention.
Figure 5:
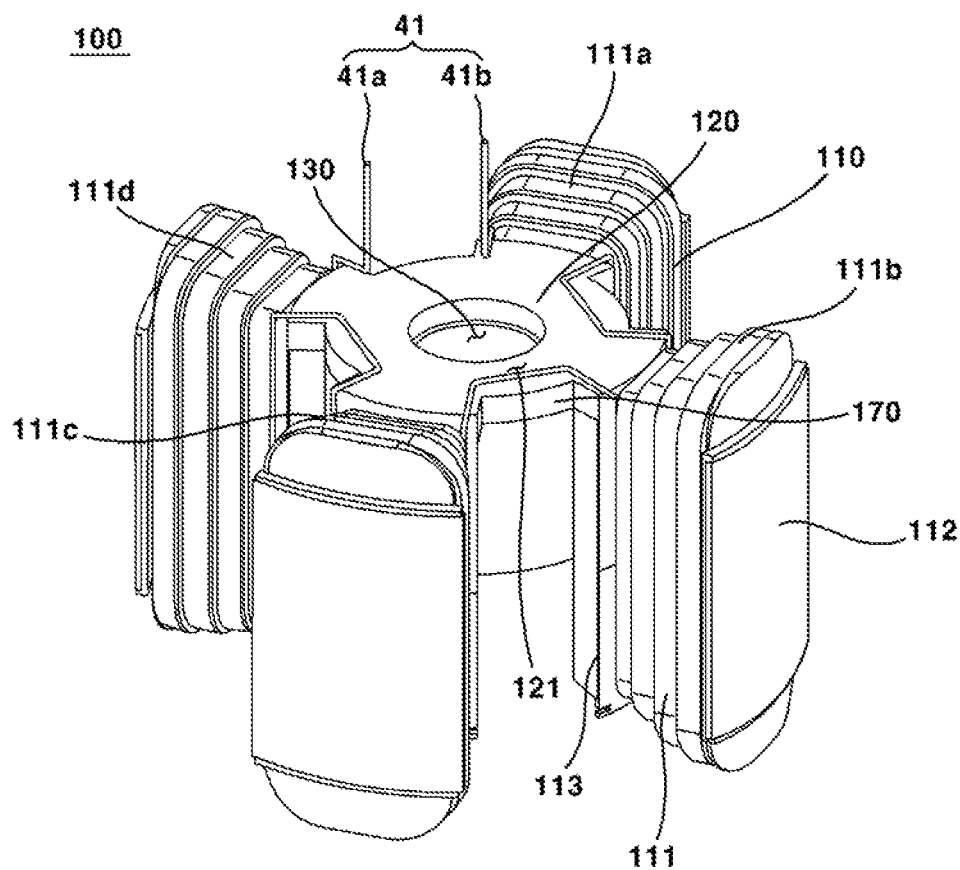
FIG. 5 is a perspective view of first rotor according to an exemplary embodiment of present invention.

FIG. 4 is a cross-sectional view illustrating a portion of a first rotor according to an exemplary embodiment of present invention, and FIG. 5 is a perspective view of first rotor according to an exemplary embodiment of present invention.

Referring to FIGS. 4 and 5, a height (h2) of the first teeth may be formed to be higher than a height of the first rotor (100), i.e., a height (h1) of the first rotor body (120). Here, the height is based on an axial direction of the motor. For example, the first teeth (110) may include a first extension part (114) more downwardly protruding than the first rotor body (120). The first extension part (114) may be interpreted as an area of an extension part of the first teeth (110) being coupled to the second rotor body (220) of the second teeth (210).

Referring to FIGS. 3, 4 and 5, the first extension part (114) may include a slide edge part (114a) including a curved inner circumferential surface aligned with an outer circumferential surface of the second rotor body (220) of the second rotor (200). The slide edge part (114a) may slidably contact, at an inner circumferential surface, an outer circumferential surface of the second rotor body (220) of the second teeth (210).

Meantime, an upper surface of the first insulator (170) may be formed with a guide part (121) aligned with the first coil (41). The guide part (121) may be so disposed at an upper surface of the first insulator (170) as to connect among the adjacent first teeth (110). The guide part (121) may be formed on the first insulator (170) such that the guide part may be called a first guide part (121).

The first guide part (121) may be formed as a lug protruding from an upper surface of the first insulator (170), or may be formed as a groove shape recessed from the upper surface.

The first rotor (100) according to an exemplary embodiment of the present invention may be serially wound with the single-lined first coil (41). For example, the first coil (41) may start with a winding from a positive distal end (41a) and may end with the winding at a negative distal end (41b). At this time, when the first coil (41) is wound on any one lug and then moved to the other adjacent lug, the first coil (41) may be accommodated at a partial area into the first guide part (121). As a result, there may be an advantageous effect of the first coil (41) being securely supported to the first rotor (100), and incurring a less amount of necessary coil for the winding. In other words, the first guide part (121) may be understood as an element where a coil is accommodated that serially connects the coils wound among the adjacent lugs.

In light of the fact that the number of disposed first teeth (110) is four (4) in the present exemplary embodiment, the first rotor (100) may be formed by allowing three first guide parts (121) to connect the adjacent first teeth (110).

Figure 6:
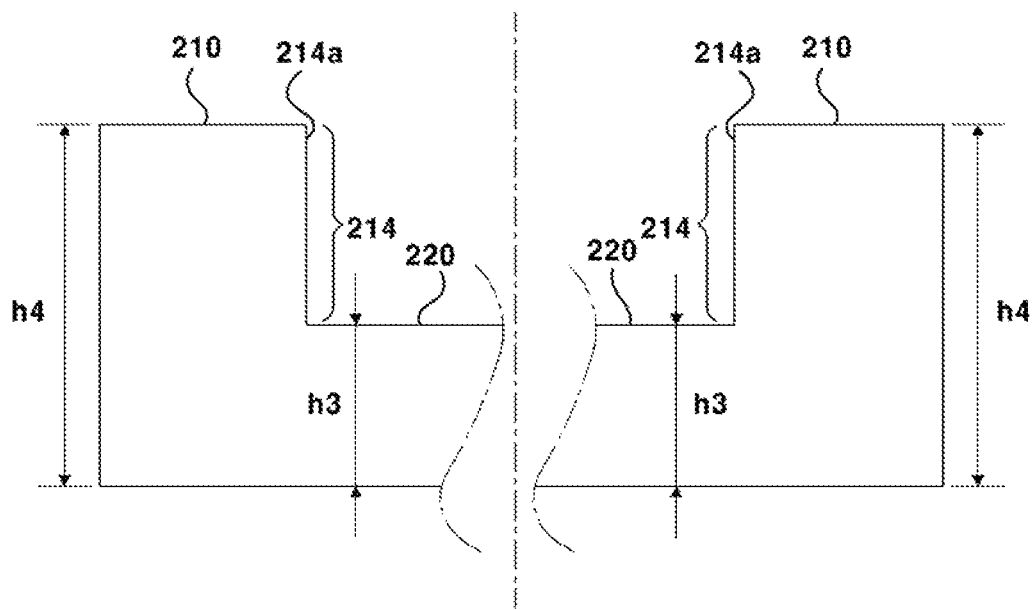
FIG. 6 is a cross-sectional view of second rotor according to an exemplary embodiment of present invention.
Figure 7:
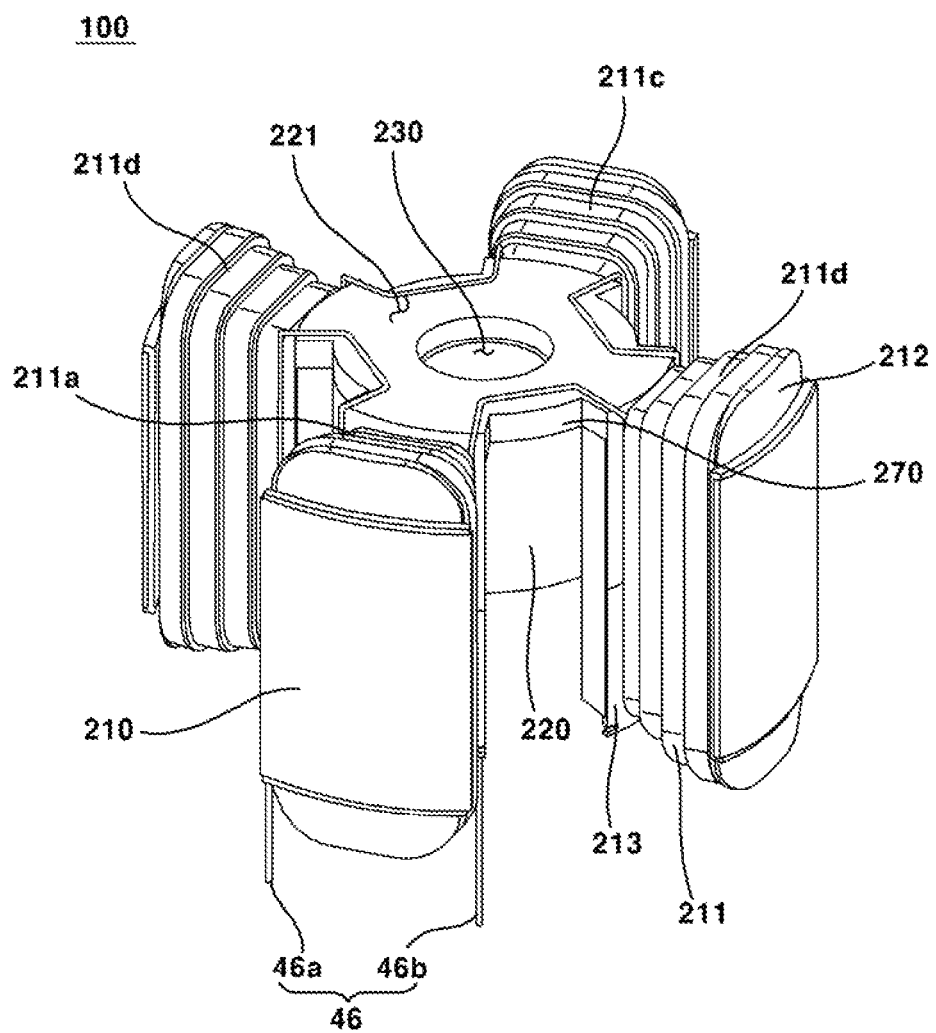
FIG. 7 is a perspective view of second rotor according to an exemplary embodiment of present invention.

FIG. 6 is a cross-sectional view of second rotor according to an exemplary embodiment of present invention, and FIG. 7 is a perspective view of second rotor according to an exemplary embodiment of present invention.

The second rotor (200) of FIG. 7 is the second rotor (200) of FIG. 3 reversely illustrated in a vertical direction.

Referring to FIGS. 6 and 7, a height (h4) of the second teeth (210) may be formed to be higher than a height of the second rotor (200), i.e., a height (h3) of the second rotor body (220). For example, the second teeth (210) may include a second extension part (214) upwardly protruding higher than the second rotor body (220). The second extension part (214) may be a portion extended by the second teeth (210) and an area coupled to the first rotor body (120) of the first teeth (110).

Referring to FIGS. 3 and 6, the second extension part (214) may include a slide edge part (214a) including a curve-shaped inner circumferential surface aligned with an outer circumferential surface of the first rotor body (120) of the first rotor (100). The inner circumferential surface of the slide edge part (214a) may slidably contact the outer circumferential surface of the first rotor body (120) at the first teeth (110).

A lower surface of the second insulator (270) in the second rotor (200) may be also formed with a guide part (221) aligned with the second coil (46). The guide part (221) may be so arranged at a lower surface of the second insulator (270) as to connect the adjacent second teeth (210). Meantime, the guide part (221) is formed on the second insulator (270) such that the guide part (221) may be called a second guide part (221).

The second guide part (221) may be formed as a lug protruding from a lower surface of the second insulator (270) or a groove recessed from the lower surface.

The second rotor (200) according to an exemplary embodiment of the present invention may be serially wound with the single-lined second coil (46). For example, the second coil (46) may start with a winding from a positive distal end (46a) and may end with the winding at a negative distal end (46b). At this time, when the first coil (41) is wound on any one lug and then moved to the other adjacent lug, the second coil (46) may be accommodated at a partial area into the second guide part (221). In other words, the second guide part (221) may be understood as an element accommodated by a coil serially connecting a coil wound on the adjacent lugs. Therefore, it should be understood that in the aspect of the rotor (10), an upper surface and a lower surface of the rotor (10) may be respectively formed with the guide parts (121, 221) to accommodate portions of the first and second coils (41, 46).

In present exemplary embodiment, because four (4) pieces of second teeth (210) are arranged, the second rotor body 100) may be formed by allowing the four-pieced second guide part (221) to connect the adjacent second teeth (210).

The reason of the number of the guide parts (121, 221) at the first rotor (100) and at the second rotor (200) being mutually different is because both distal ends of first coil (41) wound on the first rotor (100) are disposed among the adjacent first teeth (110), and the second coil (46) wound on the second rotor (200) is such that both distal ends are upwardly extended from both sides of the single second teeth (210). This is to extend the both distal ends of the second coil (46) wound on the lower surface-arranged second rotor body (100) to a direction same as that of both distal ends of the first coil (41), the details of which will be described later.

Hereinafter, a winding method of coil (40) will be described with reference to the accompanying drawings.

Figure 8:
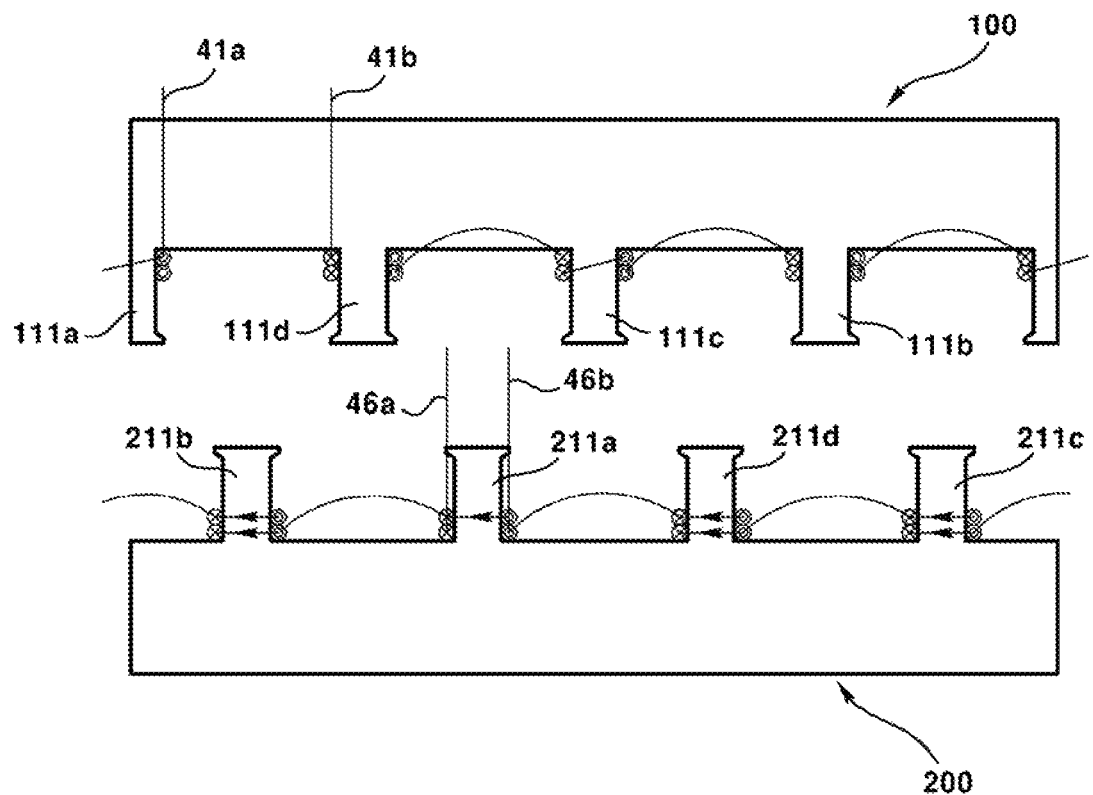
FIG. 8 is a conceptual view illustrating a coil wound on a rotor according to an exemplary embodiment of present invention.
Figure 9:
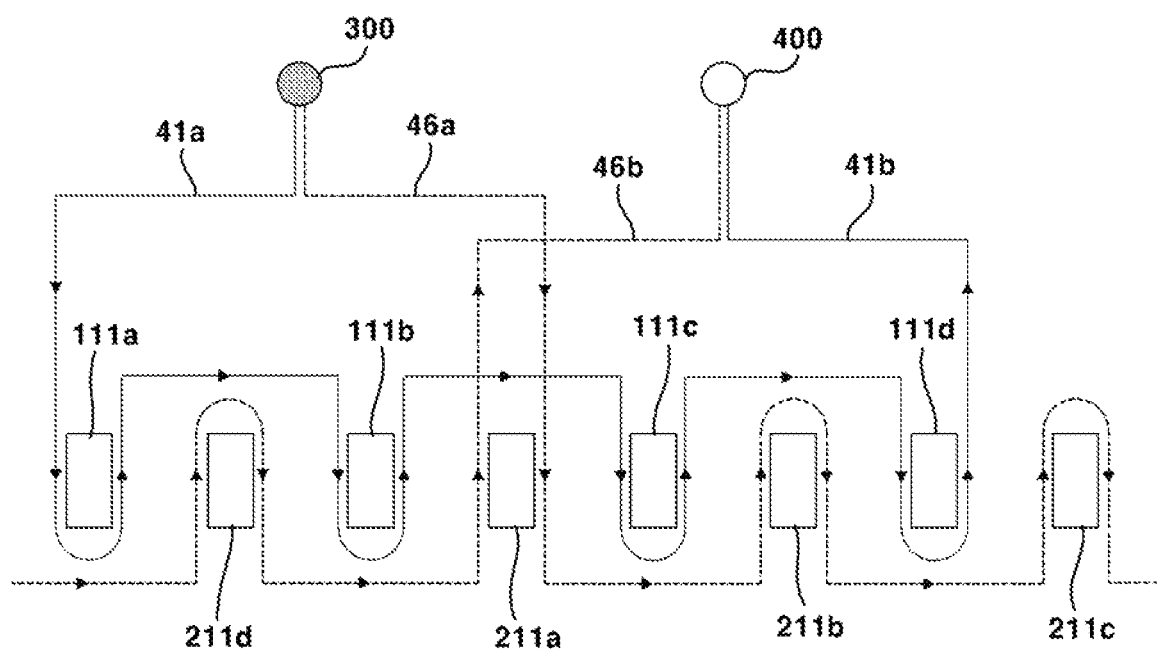
FIG. 9 is a layout diagram illustrating a coil wound on a rotor according to an exemplary embodiment of present invention.

FIG. 8 is a conceptual view illustrating a coil wound on a rotor according to an exemplary embodiment of present invention, FIG. 9 is a layout diagram illustrating a coil wound on a rotor according to an exemplary embodiment of present invention.

Referring to FIGS. 8 and 9, the first and second rotors (100, 200) according to an exemplary embodiment of the present invention may be respectively wound with a single-stranded coil (40). To be more specific, the first coil (41) wound on the first rotor (100) may be connected at one end to a positive electrode (300) and connected at the other end to a negative electrode (400) to be thereafter serially wound on the first rotor (100). Here, the positive electrode (300) means an electrode having a potential higher than that of the negative electrode (400), where the positive electrode (300) and the negative electrode (400) may be mutually and adjacently arranged.

Moreover, the second coil (46) wound on the second rotor (200) may be connected at one end to a positive electrode (300) and connected at the other end to a negative electrode (400) to be thereafter serially wound on the second rotor body (220). Here, the meaning of being serially wound on the rotor body may be interpreted as a single-stranded coil wire being wound on the plurality of first teeth (110), and both distal ends being respectively connected to the positive electrode (300) and to the negative electrode (400). The same interpretation may be applied to the second coil (46) wound on the second teeth (210). As a result, a winding structure of coil can be advantageously simplified over the parallel winding to thereby reduce the amount of consumed coils.

Meantime, we have already reviewed the fact that the first teeth (110) are disposed in a plural number along a circumferential surface of the first rotor body (120). At this time, the winding frequency of the first coil (41) among the plurality of first teeth (110), i.e., the number of turns may be same. Referring to FIGS. 8 and 9, for example, when the first coil (41) is wired onto the first teeth (110) by turning the first body (111a) twice, the second body (111b), the third body (111c), and the fourth body (111d) may be wired by being turned twice. As a result, the plurality of lugs has an advantageous effect of providing a uniform electromagnetic force because of being same in terms of the turns of the coil.

Furthermore, the coil turns of first teeth (110) and the coil turns of second teeth (210) may be same.

To be more specific, when the winding method of the first coil (41) is to be explained, the first coil (41) may be wound on the first rotor (100) to a clockwise direction or counterclockwise direction about a hole (130) which is the center of the first rotor (100). The first coil (41) starting at one end from the positive electrode (300), as illustrated in FIG. 9, may be initially wound on the first body (111a) and then wound on the second body (111b). Thereafter, the first coil (41) may be wound on the third body (111c), and then wound on the fourth body (111d). Moreover, the first coil (41) may be wound on the fourth body (111d) and then connected at the other end of the first coil (41) to the negative electrode (400).

At this time, the winding directions of the first coil (41) wound on the first body (111a), the second body (111b), the third body (111c) and the fourth body (111d) may be same. For example, when the first coil (41) is wound on the first body (111a) to a clockwise direction, the first coil (41) may be also wound to the clockwise direction for the second body (111b), the third body (111c) and the fourth body (111d). Furthermore, when the first coil (41) is wound on the first body (111a) to a counterclockwise direction, the first coil (41) may be also wound to the counterclockwise direction for the second body (111b), the third body (111c) and the fourth body (111d).

Likewise, the turns of the second coil (46) may be all the same for the plurality of second teeth (210).

For the benefit of explanation, each body of the second teeth (210) may be explained by being designated as a fifth body (211a), a sixth body (211b), a seventh body (211c) and an eighth body (211d).

However, unlike the first coil (41), when the second coil (46) is initially wound on the fifth body (211a), partial windings of the turns are wound on the other bodies (211b, 211c, 221d). In addition, when the second coil (46) is wounded on the other bodies (211b, 211c, 221d) and returned to the fifth body (211a) again, the remaining frequencies of windings are wound to be same turns as those of the other bodies (211b, 211c, 221d). That is, the second coil (46) may be partially supported to a lower surface of the second rotor (200), and upwardly extended at both ends from the both sides of the second teeth (210) whereby the turns of each lug can be formed to be same by the abovementioned winding method.

In other words, both distal ends of the second coil (46) wound on the second rotor (200) must be extended to an upward direction of the rotor (10) which is the same direction as the extension direction of both distal ends of first coil (41), such that unlike the first rotor (100), both distal ends may be disposed on both sides of the second teeth (210). Thus, in order to form the turns of coil wound on each body to be same, a partial winding may be initially wound on the fifth body (211a) and the remaining windings may be wound at the last minute.

To be more specific, the winding method of the second coil (46) will now be explained in more detail. the second coil (46) may be wound on the second rotor (200) to a clockwise direction or to a counterclockwise direction based on a hole (230) which is the center of the second rotor (200). The second coil (46) whose one end starts from the positive electrode (300) may be partially wound on the fifth body (211a) and then wound on the sixth body (211b) as illustrated in FIG. 9.

Thereafter, the second coil (46) may be wound on the seventh body (211c), and then wound on the eighth body (211d). Moreover, after the second coil (46) is wound on the eighth body (111d), the remaining frequency of winding is wound on the fifth body (211a) to allow the other end of the second coil (46) to be connected to the negative electrode (400).

For example, when the turns of second coil wound on any one lug on the plurality of second teeth (210) is designated as N, the second coil (46) may be initially wound on the fifth body (211a) by N/2 times, wound on the sixth body (211b) by N times, wound on the seventh body (211c) by N times, wound on the eighth body (211d) by N times, and returned to the fifth body (211a) and wound by the remaining N/2 times.

In another example, when the turns of second coil (46) wound on any one lug on the plurality of second teeth (210) is designated as N, the second coil (46) may be initially wound on the fifth body (211a) by N-0.5 times, wound on the sixth body (211b) by N times, wound on the seventh body (211c) by N times, wound on the eighth body (211d) by N times, and returned to the fifth body (211a) and wound by the remaining 0.5 times.

At this time, the winding directions of the second coil (46) wound on the fifth body (211a), the sixth body (211b), the seventh body (211c) and the eighth body (211d) may be the same. For example, when the second coil (46) is wound on the fifth body (211a) to a clockwise direction, the second coil (46) may be also wound on the sixth body (211b), the seventh body (211c) and the eighth body (211d) to the clockwise direction. Furthermore, when the second coil (46) is wound on the fifth body (211a) to a counterclockwise direction, the second coil (46) may be also wound on the sixth body (211b), the seventh body (211c) and the eighth body (211d) to the counterclockwise direction.

According to the rotor (10) thus configured, a rotor may be formed by allowing a plurality of rotor bodies to be stacked, and each rotor body may be included with lugs wound by the coil, and lugs of each rotor body may be alternately arranged based on a circumferential direction to allow the divided lugs to form an entire lug, whereby coils may be wound on the divided lugs where a relatively broader space can be obtained, unlike the rotor integrally formed with the lugs wound with the coils. As a result, there is an advantageous effect of the coil space factor being increased and performing an easy winding operation.

Furthermore, another advantage is that a guide part is formed on an upper and lower surface of the first and second insulators to allow the coil to be securely supported on the rotor body and the amount of consumed coils to be reduced.

Still furthermore, each rotor body is serially wound with a single stranded coil to advantageously simplify the winding structure of coils.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A rotor comprising:
a first rotor which comprises a first rotor body and a plurality of first teeth formed on an outer circumferential surface of the first rotor body;
a second rotor which comprises a second rotor body stacked on and coupled to the first rotor body and a plurality of second teeth formed on an outer circumferential surface of the second rotor body;

a first coil which is wound around the first teeth;

a second coil which is wound around the second teeth;

a first insulator which is disposed between the first teeth and the first coil; and a second insulator which is disposed between the second teeth and the second coil, wherein an upper surface of the first insulator disposed at an upper side of the first rotor body may be formed with a first guide part arranged with the first coil, and a lower surface of the second insulator disposed at a lower side of the second rotor body may be formed with a second guide part arranged with the second coil, and wherein the plurality of first teeth are formed in the same winding number as that of the first coil, and the plurality of second teeth are formed in the same winding number as that of the second coil.

2. The rotor of claim 1, wherein the first guide part and the second guide part are grooves respectively recessed from an upper surface of the first insulator and a lower surface of the second insulator.

3. The rotor of claim 1, wherein the first guide part and the second guide part are lugs respectively protruded from an upper surface of the first insulator and a lower surface of the second insulator.

4. The rotor of claim 1, wherein the second teeth are inserted into a first reception groove formed between adjacent the first teeth when the first rotor and the second rotor are coupled, and the first teeth are inserted into a second reception groove formed between the adjacent second teeth.

5. The rotor of claim 1, wherein a sum of heights of the first rotor body and the second rotor body corresponds to a height of the first teeth or to a height of the second teeth.

6. The rotor of claim 1, wherein the first coil is wound in series with the first teeth, and the second coil is wound in series with the second teeth.

7. The rotor of claim 1, wherein the first coil is wound to a clockwise direction or to a counterclockwise direction about a center of the first rotor body.

8. The rotor of claim 1, wherein the second coil is wound to a clockwise direction or to a counterclockwise direction about a center of the second rotor body.

9. The rotor of claim 1, wherein the first teeth include first, second, third and fourth bodies, each protruding from an outer circumferential surface of the first rotor body while maintaining a mutual gap, and the second teeth include fifth, sixth, seventh and eighth bodies, protruding from an outer circumferential surface of the second rotor body while maintaining a mutual gap.

10. The rotor of claim 9, wherein the first coil is respectively wound on the first, second, third and fourth bodies to a clockwise direction.

11. The rotor of claim 9, wherein the second coil is respectively wound on the fifth, sixth, seventh and eighth bodies to a clockwise direction.

12. The rotor of claim 9, wherein, when the winding number of second coil wound on the second teeth is defined as N, the second coil is initially wound on the fifth body by N/2 times, wound on the sixth body by N times, wound on the seventh body by N times, wound on the eighth body by N times, and returns to the fifth body to be wound by N/2 times.

13. The rotor of claim 9, wherein, when the winding number of second coil wound on the second teeth is defined as N, the second coil is initially wound on the fifth body by N/0.5 times, wound on the sixth body by N times, wound on the seventh body by N times, wound on the eighth body by N times, and returns to the fifth body to be wound by 0.5 times.

14. The rotor of claim 1, wherein the first teeth comprise an arm-type first body connected to the first rotor body; and a rim-type first shielding lug formed at a tip of the first body, and a first guide lug is disposed on an outer surface of the first body adjacent to the first rotor body.

15. The rotor of claim 14, wherein the second teeth comprise an arm-type second body connected to the second rotor body; and a rim-type second shielding lug formed at a tip of the second body, and a second guide lug is disposed on an outer surface of the second body adjacent to the second rotor body.

16. The rotor of claim 15, wherein a side surfaces of the first body and the second body are each formed with an inclined surface so that the cross-sectional area increases toward the outer side.

17. The rotor of claim 1, wherein the height of the first rotor body corresponds to the height of the first teeth, and
the height of the second rotor body corresponds to the height of the second teeth.

18. The rotor of claim 1, wherein the first guide is arranged to connect between adjacent ones of the plurality of first teeth, and
the second guide is arranged to connect between the adjacent second teeth among the plurality of second teeth.

19. The rotor of claim 1, wherein both ends of the first coil and both ends of the second coil extend upward of the first rotor.

20. A motor, comprising:
a housing;
a stator disposed at an inside of the housing; and
a rotor according to claim 1 disposed at an inside of the stator to face the stator.

* * * * *